United States Patent [19]

Nishikawa et al.

[11] 4,191,281
[45] Mar. 4, 1980

[54] DAMPING-FORCE CONTROL MECHANISM IN A HYDRAULIC SHOCK ABSORBER

[75] Inventors: Masao Nishikawa, Tokyo; Hitoshi Yamamoto, Asaka, both of Japan

[73] Assignee: Honda Giken Kogyo Kabushiki Kaisha, Tokyo, Japan

[21] Appl. No.: 920,997

[22] Filed: Jun. 30, 1978

[30] Foreign Application Priority Data

Feb. 18, 1978 [JP] Japan .................................. 53-17850

[51] Int. Cl.² ............................................ F16F 9/44
[52] U.S. Cl. .............................. 188/319; 137/625.31; 251/206
[58] Field of Search .............................. 188/299, 319; 137/625.3, 625.31; 251/206; 138/46

[56] References Cited

U.S. PATENT DOCUMENTS

| | | | |
|---|---|---|---|
| 1,144,530 | 6/1915 | De Fernanzo | 188/319 |
| 1,618,326 | 2/1927 | Cosentino | 188/319 |
| 3,589,399 | 6/1971 | Vignes | 137/625.3 |
| 3,827,538 | 8/1974 | Morgan | 188/319 |

FOREIGN PATENT DOCUMENTS 1175694  3/1959  France .................................. 188/299

Primary Examiner—Edward R. Kazenske
Attorney, Agent, or Firm—Haseltine, Waters & Lake

[57] ABSTRACT

A damping force control mechanism in a hydraulic shock absorber having a piston disposed within a cylinder casing so as to define a pair of hydraulic chambers. A plurality of ports are formed through the partition to enable passage of hydraulic fluid between the hydraulic chambers and an orifice plate mounted on the partition enables stepwise rotation relative thereto. Orifice apertures formed through the plate pass one of the ports upon rotation of the orifice plate where the apertures have differential diameters so as to afford differential resistances to hydraulic fluid passing therethrough. At least two of the apertures are upon stepwise rotation of the orifice plate, in fluid communication with one port, and at least one of the apertures in communication with the port are retained in this state upon a further rotation of the orifice plate.

6 Claims, 4 Drawing Figures

U.S. Patent   Mar. 4, 1980   Sheet 1 of 2   4,191,281
FIG. 1
FIG. 2
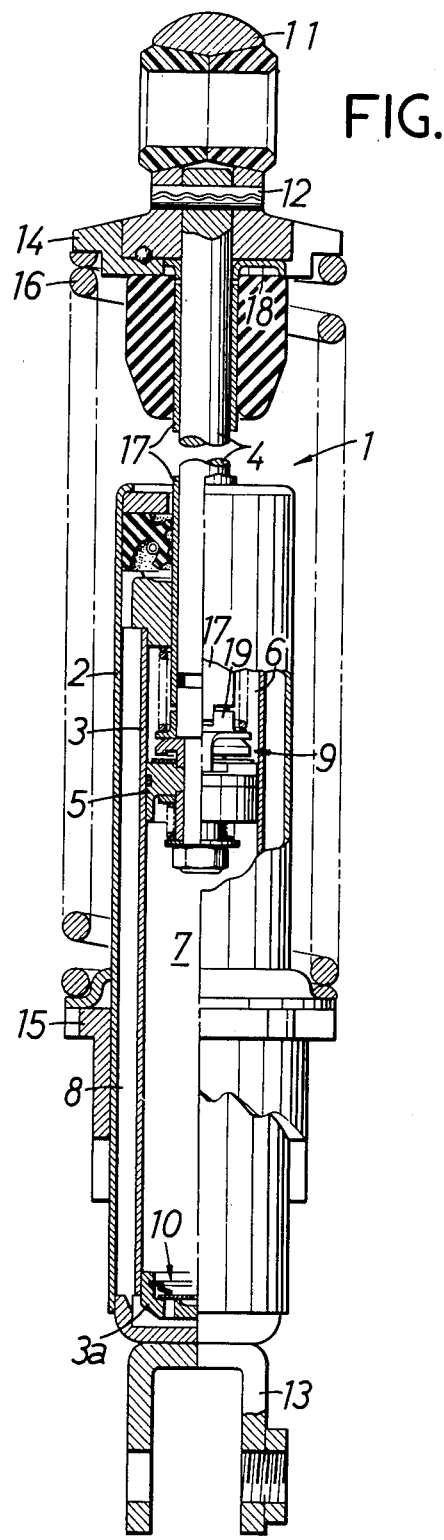
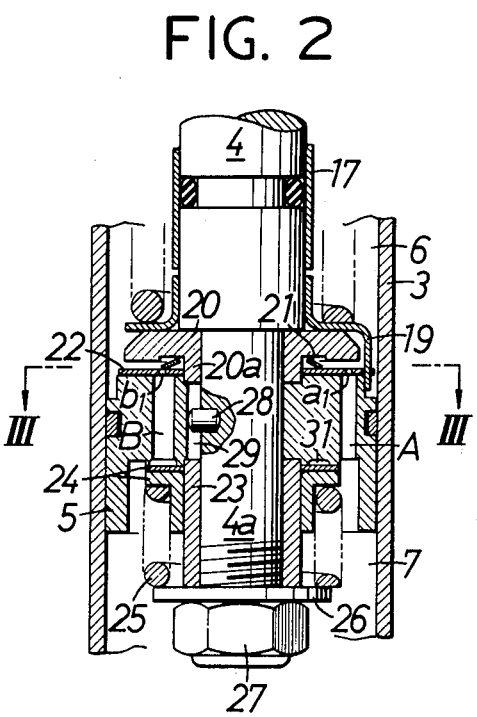

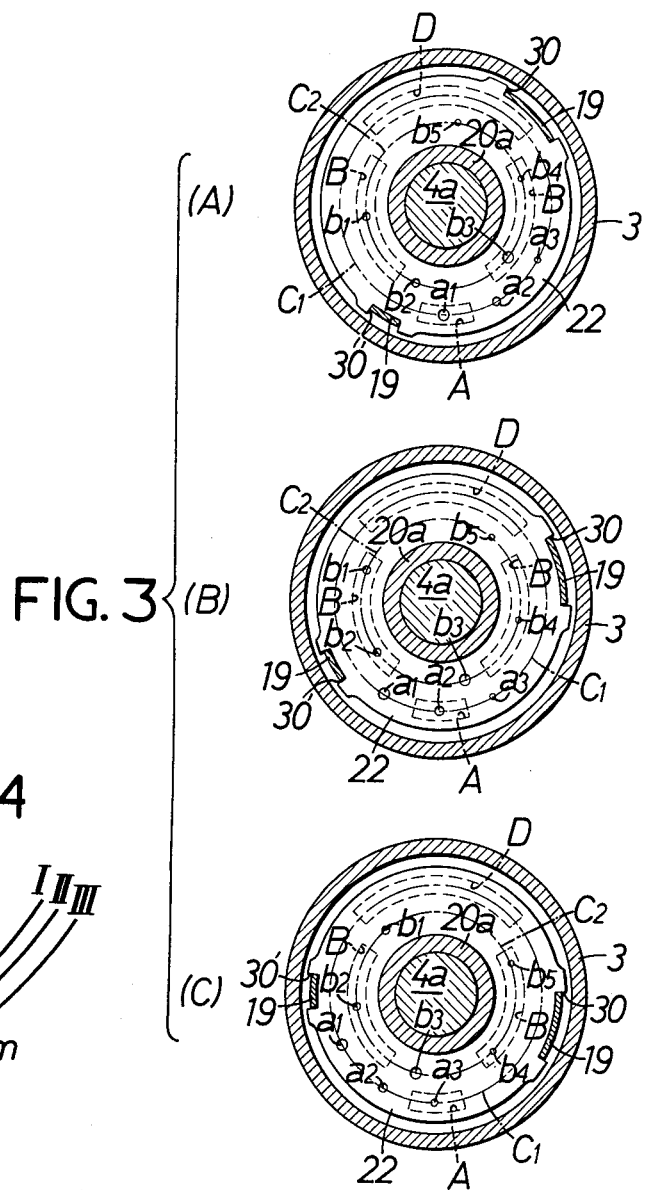
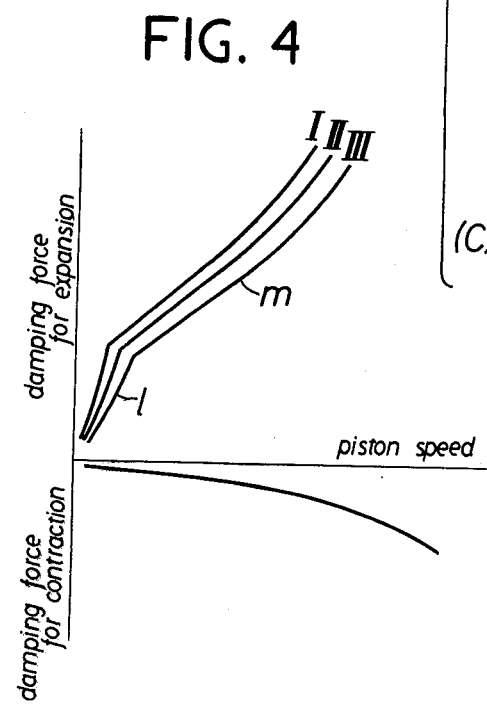
FIG. 3
FIG. 4

DAMPING-FORCE CONTROL MECHANISM IN A HYDRAULIC SHOCK ABSORBER

BACKGROUND OF THE INVENTION

The present invention relates to a damping-force control mechanism in a hydraulic shock absorber for use with a suspension system of automotive vehicles.

In hydraulic shock absorbers for automotive vehicles, the damping-force can preferably be controlled in accordance with driver's taste, running conditions of vehicles, carrying conditions, and so on. The damping-force is required to be controlled particularly with such vehicles as a motorbicycle, since such vehicle is lightweight but involves a considerable variation in load i.e. a vehicle with goods, multiple use vehicles, etc.

An attempt has already been made to meet the needs as described above by providing an arrangement wherein a partitioning member such as a piston disposed within the shock absorber has ports made therein through which oil within the shock absorber flows upon operation of the shock absorber. A stepwise rotatable orifice plate placed over an end surface of the partitioning member to which the ports are open; the orifice plate has a plurality of orifices different in diameter made therein which are selectively placed in communication with the port upon rotation of the orifice plate, and the damping-force may be controlled with change in flow resistance of an orifice in communication with the port. However, the conventional damping-force control mechanism as noted above possesses a disadvantage in which an error in machining of the orifices can produce substantial irregurality in the amount of change in the damping-force generated every step of rotation of the orifice plate.

SUMMARY OF THE INVENTION

It is the main object of the present invention to overcome the defects of the prior art.

It is another object of the present invention to provide a damping-force control mechanism in the hydraulic shock absorber which can accurately control the damping-force, while removing the disadvantages noted above with respect to prior arts.

The principal features of the present invention are directed to a damping-force control apparatus for use with a hydraulic shock absorber including: a piston disposed within a cylinder casing defining a pair of hydraulic chambers, passage means formed in said piston to enable passage of fluid between respective chambers, an orifice plate rotatably mounted on said piston being movable in a stepwise fashion with respect thereto and orifice means formed to cooperate with said plate whereby relative movement of said plate with respect to said orifice means forms a resistive force opposed to the movement of hydraulic fluid therethrough.

Other objects and advantages of the present invention will be best understood with respect to the specification, claims and drawings.

IN THE DRAWINGS

FIG. 1 is a side elevational view, partly in cross section;

FIG. 2 is an enlarged longitudinal sectional view showing a principal part thereof;

FIG. 3 (A), (B) and (C) are respectively sectional views taken along the line III—III of FIG. 2 with the orifice plate or disc set to its respective different rotative positions; and FIG. 4 is a diagram illustrating the damping characteristic curves.

DESCRIPTION OF THE INVENTION

One embodiment of the present invention will now be described with reference to the accompanying drawings. Referring to FIG. 1, there is shown a shock absorber 1 which comprises a cylinder 3 fixedly secured in a tubular casing 2 and filled with hydraulic oil and a piston 5 slidably fitted in the cylinder 3, and integrally connected with a piston rod 4, which extends upwardly beyond the tubular casing 2. The space in the cylinder 3 is divided into two sections by piston 5 into upper and lower fluid chambers 6 and 7. The cylinder 3 and the tubular casing 2 define an oil reservoir 8 therebetween. An upper cushion valve 9 in provided on the piston 5. During extension of the shock absorber 1, the piston 5 controls the flow of oil from the upper fluid chamber 6 to the lower fluid chamber 7, thus developing a damping effect upon the extending motion of the shock absorber. At a bottom wall 3a of the cylinder 3 is a lower cushion valve 10, which, during contraction of the shock absorber 1, controls the flow of oil from the lower fluid chamber 7 to the oil reservoir 8, thus developing a damping effect upon the contracting motion of the shock absorber.

An eyeball-like upper mounting member 11 is firmly secured to the top end of the piston rod 4 by a spring pin 12 for connection with the body frame of the vehicle. A channel-shaped lower mounting member 13 which is to be connected to a wheel-supporting member is secured at the lower end of the tubular casing 3, for example, the swing rear fork of a motorcycle. A coiled suspension spring 16 is arranged between an annular upper spring seat 14, supported on the upper mounting member 11, and a lower spring seat 15, being vertically adjustably mounted on the external periphery of the tubular casing 2 by appropriate well-known means.

The upper spring seat 14 is in the form of a damping-force control dial which is rotatable in three steps. This adjusting dial 14 is connected through an upper claw-clutch member 18 with an adjusting sleeve member 17 rotatably fitted over the outer periphery of the piston rod 4. The adjusting sleeve member 17 is connected, as will be described later, through a lower claw-clutch member 19 with the upper cushion valve 9, so that the cushion valve 9 can be controlled as desired by turning the adjusting dial 14.

As shown in FIGS. 2 and 3, the piston rod 4 has a reduced-diameter bottom end portion 4a on which are fittingly assembled a number of parts, including a rebound stopper 20, a leaf spring 21, an orifice plate 22, the piston 5, a spacer tube 23, a plate valve member 24, a valve spring 25 and a spring seat 26, in the order as illustrated. Finally, a nut 27 is tightly fitted over the rod end portion to hold these parts in place thereon and the rod end portion 4a is set at its extreme end to prevent any loosening thereof. With this arrangement, the reduced-diameter portion 4a and the piston 5 are integrally joined together by means of a key 28 set on the reduced-diameter portion 4a and a key groove 29 formed in the piston 5 for fitting engagement with the key 28. The orifice disc 22 is fitted over the boss portion 20a of the rebound stopper 20 for rotation and sliding movement relative thereto.

Thus, the leaf spring 21, the orifice plate 22, the plate valve member 24 and the valve spring 25 constitute the aforementioned cushion valve 9.

The orifice plate 22 is made of a thin steel sheet and formed with two sets of orifices a, one set including three low speed orifices $a_1$ to $a_3$ of different diameter and the other including five high speed orifices $b_1$ to $b_5$ of different diameter. The low speed orifices $a_1$ to $a_3$ are arranged in given angularly spaced relation along a first circle $C_1$ concentric with the orifice plate 22, whereas, the high speed orifices $b_1$ to $b_5$ are similarly arranged in given angularly spaced relation along a second circle $C_2$ concentric with the orifice plate 22 and smaller in diameter than that of the first circle $C_1$.

The piston 5 is formed at the first circle $C_1$ with a low speed port A and a unidirectional port D which vertically extend through the piston 5 and at the second circle $C_2$ with two high speed ports B and B which similarly (vertically) extend through the piston 5 and are arranged symmetrically with each other.

The low speed orifices $a_1$ to $a_3$ have their diameters gradually reduced in counterclockwise direction so that when the orifice plate 22 is rotated step by step in clockwise direction in FIG. 3, the orifices are successively placed in communication one by one with the low speed port A, so as to successively increase the flow resistance in the low speed system. Similarly, the high speed orifices $b_1$ to $b_5$ are designed so that when the orifice plate 22 is rotated step by step in clockwise direction in FIG. 3, the orifices or three orifices are successively placed in communication with the high speed ports B and B to successively increase the flow resistance in the high speed system. Further, two orifices out of three high speed orifices thus communicated with the high speed ports B and B still communicate with the high speed ports B and B as the orifice plate 22 assumes its next rotative position.

A pair of notches 30 and 30' are formed in the orifice plate 22 along the outer periphery thereof for engagement with claws of the lower claw clutch member 19. Accordingly, when the adjusting dial 14 is turned, the orifice plate 22 can be suitably rotated through the upper claw clutch member 18, the adjusting sleeve member 17 and the lower claw clutch member 19.

An annular groove 31 formed in the underside of piston 5 provides communication between two high speed ports B, B. The valve member 24 is normally biased against the lower surface of the piston 5 by the resilient force of the valve spring 25 so as to close the annular groove 31.

With the construction described above, as an axial compressive load is applied to the shock absorber 1, the piston 5 descends within the cylinder 3, the pressure in the lower fluid chamber 7 is increased, and pressure is exerted on the lower surface of the orifice plate 22 through the low pressure port A and the unidirectional port D, causing the orifice plate 22 to rise against the set load of the leaf spring 21, to open ports A and D. This allows free passage of oil from the lower fluid chamber 7 to the upper fluid chamber 6 through the ports A and D.

On the other hand, a flow of oil from the lower fluid chamber 7 to the oil reservoir 8 through the lower cushion valve 10 occurs as a result of an increase in volume occupied by the piston rod 4 within the cylinder 3, and a damping force is produced in the lower cushion valve 10 in a conventional manner.

Subsequently, when the compressive load is removed to extend the shock absorber 1 under the bias of the suspension spring 16, the orifice plate 22 is pressed (when the ascending speed of the piston 5 is relatively slow) against the top surface of the piston 5 under the pressure increased in the upper fluid chamber 6. If the orifice plate 22 is in the adjusted position shown in FIG. 3 (A), a flow of oil occurs from the upper fluid chamber 6 to the lower fluid chamber 7 through the low speed orifice $a_3$ and the low speed port A. Apparently, the flow of oil is restrained by the orifices $a_1$ and a predetermined damping force is obtained. In this stage, as the valve member 24 is still held closed, the damping characteristic of the cushion valve follows a quadratic curve 1 shown in FIG. 4, which rises at a rate determined by the diameter of the low speed orifice $a_1$ in communication with the low speed port A.

Subsequently, when the speed of piston 5 has increased to such an extent that the differential pressure between the upper and lower fluid chambers 6 and 7 reaches a predetermined level, the valve member 24 is moved to open against the bias of the preloaded valve spring 25 so that oil flows through the high speed ports B, B from the high speed orifices $b_1$, $b_3$ and $b_4$ to retard the rate of increase of the damping force and, accordingly, the damping characteristic curve is flexed to follow a line m. It is to be noted, that the point of flexion of the characteristic curve is determined by the load previously set on the valve spring 25.

Subsequently, when the rising speed of the piston 5 reaches a higher level, the oil flow through the high speed ports B, B is restrained by the high speed orifices $b_1$, $b_3$ and $b_4$ so that the characteristic curve m starts to again follow a quadratic curve, the slope is determined obviously by the cross-sectional area of three high speed orifices $b_1$, $b_3$ and $b_4$ in communication with the high speed ports B, B.

When the adjusting dial 14 is rotated to rotate the orifice plate 22 from the state shown in FIG. 3 (A) to the states shown in FIGS. 3 (B) and (C), the low speed orifices in communication with the low speed port A are shifted from $a_1$ to $a_2$ and $a_3$ and as a consequence, the flow resistance in the low speed system increases, and at the same time, three high speed orifices in communication with the high speed ports B, B are shifted from $b_1$, $b_3$ and $b_4$ to $b_1$, $b_2$ and $b_4$: $b_2$, $b_4$ and $b_5$. As a result, the slope of quadratic curves 1 and m changes in the manner indicated in FIG. 4 at I, II and III.

Here, it is particularly to be noted that the high speed orifices $b_1$ and $b_4$ in communication with the high speed ports B, B in the case shown in FIG. 3 (A) remain in communication with the high speed ports B, B. Also in the case of the subsequent stage or shown in FIG. 3 (B) the two high speed orifices $b_2$, $b_4$ in communication with the high speed ports B, B per FIG. 3 (B), remain in communication with the high speed ports B, B as is also in the case of the subsequent stage shown in FIG. 3 (C). Accordingly, only one high speed port is placed in communication with the high speed ports B, B in the respective stages and the amount of change of the damping force in the high speed system is determined only by said one orifice. Thus, in formation of high speed orifices $b_1$ to $b_5$, such orifices of sizes corresponding to the amount of change of predetermined damping force may be successively formed.

While the damping-force control mechanism, which comprises the subject matter of the present invention, has been applied to the damping-force generator in the high speed system in the upper cushion valve 9, it should be noted that the mechanism may be applied also to the low speed system as well as the lower cushion valve 10.

As described above, in accordance with the present invention, a plurality of orifices for the control of damping force may be formed in the orifice plate in a manner such that orifices of sizes only corresponding to the amount of change of damping force that may be obtained in respective rotative positions of the orifice plate are successively formed. Accordingly, even if there is present any minor error in machining of these orifices, an unevenness of the amount of change in damping force produced every step of rotation of the orifice plate may be minimized and the damping force may always accurately be controlled.

Many modifications and variations of the present invention are possible in light of the above teachings. It is, therefore, to be understood that within the scope of the appended claims, the invention may be practiced otherwise than as particularly described.

What we claim is:

1. A damping force control apparatus for use with a hydraulic shock absorber comprising a piston disposed within a cylinder casing defining a pair of hydraulic chambers, passage means formed in said piston to enable passage of fluid between said chambers, an orifice plate mounted on said piston for stepwise rotation relative thereto, a plurality of orifices formed through said orifice plate and each having a cross sectional area different from each other and smaller than said passage means for controlling flow of fluid passing therethrough by stepwise rotation of said orifice plate relative to said piston, said orifices being disposed in angularly spaced relationship in such a circular pattern that at least two of said orifices, which communicated with said passage means upon the last stepwise rotation of said orifice plate, remain in the communication state upon a further stepwise rotation of said orifice plate and at least one of said orifices, which was out of communication with said passage means upon the last stepwise rotation of said orifice plate, is placed into communication with said passage means upon said further stepwise rotation of said orifice plate with a corresponding number of said orifices, which were in communication with said passage means upon the last stepwise rotation of said orifice plate, being placed out of communication with said passage means upon said further stepwise rotation of said orifice plate.

2. A damping force control apparatus for use with a hydraulic shock absorber as set forth in claim 1, wherein said orifice plate is resiliently biased into contact with said piston so as to be effective only during flow of fluid in one direction between said chambers, flow of fluid in the reverse direction serving to move said orifice plate away from said piston to render said orifice plate ineffective.

3. A damping force control apparatus for use with a hydraulic shock absorber as set forth in claim 1, wherein said orifice plate is connected with a member rotatably mounted on a piston rod of said piston so that said orifice plate can be rotated with respect to said piston by rotating this member with respect to said piston rod.

4. A damping force control apparatus for use with a hydraulic shock absorber comprising a piston disposed within a cylinder casing defining a pair of hydraulic chambers, first and second passage means formed through said piston for communication between said chambers, an orifice plate mounted on one side of said piston for rotation relative thereto and being resiliently biased into contacting engagement with said piston, said orifice plate having orifice means formed therethrough for controlling flow of fluid passing through said first and second passage means, said orifice means including a first and a second set of orifices respectively having a cross sectional area different from each other and smaller than said first and second passage means and adapted to register with said first and second passage means, respectively, and a valve means disposed on the other side of said piston and being resiliently biased into contacting engagement with the other side face of said piston for normally closing said second passage means, said valve means being placed into an open condition relative to said second passage means when a pressure differential between said chambers exceeds a certain level, said second set of orifices being disposed in angularly spaced relationship in such a circular pattern that at least two of said orifices, which communicated with said second passage means upon the last stepwise rotation of said orifice plate, remain in the communication state upon a further stepwise rotation of said orifice plate and at least one of said second set of orifices, which was out of communication with said second passage means upon the last stepwise rotation of said orifice plate, is placed into communication with said second passage means upon said further stepwise rotation of said orifice plate with a corresponding number of said second set of orifices, which were in communication with said second passage means upon the last stepwise rotation of said orifice plate, being placed out of communication with said second passage means upon said further stepwise rotation of said orifice plate.

5. A damping force control apparatus for use with a hydraulic shock absorber as set forth in claim 4, wherein said first set of orifices are arranged in angularly spaced relationship in a circular pattern and the diameters of said orifices of said first set gradually reduce with respect to one another as viewed in one direction around the circle along which they are spaced, each of these orifices in turn being brought into communication with said first passage means by said stepwise rotation of said orifice plate.

6. A damping force control apparatus for use with a hydraulic shock absorber as set forth in claim 5, wherein said orifice plate is connected with a member rotatably mounted on a piston rod of said piston so that said orifice plate can be rotated with respect to said piston by rotating this member with respect to said piston rod.

* * * * *